United States Patent [19]
McFarland et al.

[11] 3,878,000
[45] Apr. 15, 1975

[54] RECOVERY OF COBALT-RARE EARTH ALLOY PARTICLES BY HYDRATION-DISINTEGRATION IN A MAGNETIC FIELD

[75] Inventors: Charles M. McFarland; Theodore B. Lerman; Alan C. Rockwood, all of Schenectady, N.Y.

[73] Assignee: General Electric Company, Schenectady, N.Y.

[22] Filed: June 3, 1974

[21] Appl. No.: 475,969

[52] U.S. Cl. ............. 148/108; 148/105; 148/31.57; 209/8; 209/138; 209/158; 209/214; 209/226
[51] Int. Cl. .............................................. C21d 1/04
[58] Field of Search .......... 148/108, 105, 103, 101, 148/31.57; 23/267, 270, 309, 310, 312; 209/8, 39, 138, 158, 174, 176, 214, 226; 75/.5 BA

[56] References Cited
UNITED STATES PATENTS

| | | | |
|---|---|---|---|
| 2,633,987 | 4/1953 | Bean | 209/39 |
| 2,683,685 | 7/1954 | Matheson | 209/138 |
| 3,625,779 | 12/1971 | Cech | 148/101 |
| 3,687,284 | 8/1972 | Leeman et al. | 209/39 |
| 3,748,193 | 7/1973 | Cech | 148/101 |

*Primary Examiner*—Walter R. Satterfield
*Attorney, Agent, or Firm*—Jane M. Binkowski; Joseph T. Cohen; Jerome C. Squillaro

[57] ABSTRACT

A process for recovering magnetic alloy particles from a reaction product cake. The cake is placed in a reactor where it is contacted with a flowing water vapor-carrying gas which reacts with its calcium content to disintegrate the cake and produce a hydrated powder comprised substantially of calcium hydroxide and the alloy particles. A magnetic zone is generated into a cross-section of the reactor substantially encircling the inside wall thereof. The zone is generated by at least two poles of opposite polarity running the length of the zone. The hydrated powder is fluidized to dissociate and pass the calcium hydroxide out of the reactor. Finer-sized alloy particles carried by the fluidizing gas into the magnetic zone are subjected to the magnetic field where the poles are rotated or reversed at a rate which reverses the positions of the particles sufficiently to release adherent calcium hydroxide leaving the finer-sized alloy particles substantially within the magnetic zone.

6 Claims, 1 Drawing Figure

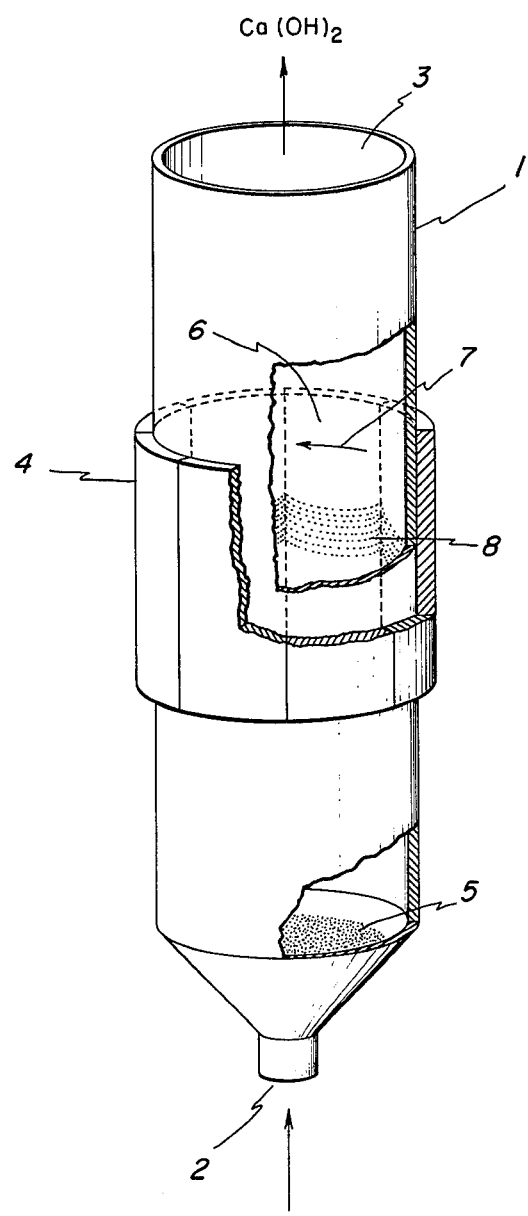

RECOVERY OF COBALT-RARE EARTH ALLOY PARTICLES BY HYDRATION-DISINTEGRATION IN A MAGNETIC FIELD

The present invention relates to the treatment of a magnetic alloy containing material produced by a reduction-diffusion process. It relates particularly to the hydration-disintegration of such material without significantly deteriorating the magnetic properties of the magnetic rare earth alloy particles contained therein and to the separation and recovery of the alloy particles.

U.S. Pat. No. 3,748,193, which is assigned to the assignee hereof and which by reference is made part of the disclosure of the present application, relates to a reduction-diffusion process for producing rare earth intermetallic compounds or alloys. Briefly stated, one embodiment of the disclosed process comprises providing a particulate mixture of a rare earth metal oxide, calcium hydride and a metal such as cobalt or iron, or alloys or mixtures thereof which can also include manganese, heating the particulate mixture in a non-reactive atmosphere to decompose the calcium hydride and thereby effect reduction of the rare earth metal constituent, then heating the resulting mixture in a non-reactive atmosphere to diffuse the resulting rare earth metal into the aforementioned metal particles to form the desired rare earth intermetallic alloy particles which are then recovered from the product.

It is actually calcium resulting from the decomposition of the calcium hydride which acts to reduce the rare earth oxide to form the rare earth metal. If desired, the calcium hydride can be formed in situ by a number of methods. One particular advantage of the use of calcium hydride is that calcium does not alloy in any significant amount with the cobalt-rare earth alloy or other magnetic rare earth alloys formed herein.

The oxides of the rare earth metals useful in the disclosed patented process are those of the rare earth metals which are the 15 elements of the lanthanide series having atomic numbers 57 to 71 inclusive. The element yttrium (atomic number 39) is commonly found with and included in this group of metals and, in this disclosure, is considered a rare earth metal. Mixtures of rare earth metal oxides can also be used. Representative of the oxides useful in the present invention are samarium oxide ($Sm_2O_3$), yttrium oxide ($Y_2O_3$) and mischmetal oxides ($M_2O_3$), mischmetal being the most common alloy of the rare earth metals which contains the metals in the approximate ratio in which they occur in their most common naturally occurring ores.

A number of rare earth intermetallic alloys can be formed merely by using the proper amount of the active constituents. The following equation represents the stoichiometric reaction for forming $Co_5R$, where R is a rare earth metal, by the reduction of the rare earth from the oxide to a constituent of the cobalt intermetallic alloy using samarium as an example:

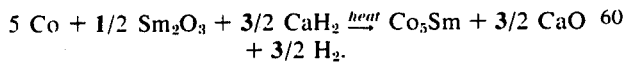

$$5\ Co + 1/2\ Sm_2O_3 + 3/2\ CaH_2 \xrightarrow{heat} Co_5Sm + 3/2\ CaO + 3/2\ H_2.$$

U.S. Pat. No. 3,748,193 discloses that preferably, an amount of calcium hydride in excess of the stoichiometric amount necessary to reduce the rare earth metal oxide is used so that the excess calcium hydride is converted to metallic calcium which precipitates at the boundaries of the particles of the resulting cobalt-rare earth intermetallic compound, and that the resulting product mass can then be placed in air or other oxygen and moisture-containing atmosphere to allow the precipitated calcium to oxidize whereupon it undergoes a change in volume sufficient to disintegrate the mass and release the particles of the cobalt-rare earth intermetallic compound.

When an excess amount of calcium hydride is used, a reaction product cake is produced wherein particles of rare earth intermetallic alloy, for example, cobalt-rare earth alloy, are substantially or completely surrounded by calcium and/or calcium oxide. Also, depending on the particular reaction conditions and atmospheres with which the product cake is contacted, calcium hydride and calcium nitride may also be present, usually in minor amounts, at or between the boundaries of the alloy particles. Placing such a cake or lumps thereof in a moisture containing atmosphere to hydrate the calcium and its compounds to produce calcium hydroxide and disintegrate the cake by the accompanying volume expansion is a slow process which tends to be partially blocked off by the disintegrating powder and is not practical on a commercial scale. The problem is that the disintegration does not proceed at the same rate uniformly throughout the cake but proceeds in stages since not all of the calcium or calcium compounds can be contacted with the moisture containing atmosphere at the same time. Specifically, with each disintegration additional calcium or calcium compound is exposed and only then becomes available for reaction with the moisture. The disadvantage inherent in the use of water or an oxidizing atmosphere is that they react with the alloy particles and cause them to oxidize and lose their magnetic properties.

The present invention provides a significantly faster, substantially uniform hydration technique for disintegrating the cake or lumps thereof to substantial completion to produce a hydrated powder product containing discrete particles of the magnetic rare earth alloy without significant deterioration of their magnetic properties. Also, the present invention provides for a dry recovery of the alloy particles from the hydrated product.

Briefly stated, the present invention is a process for hydrating and disintegrating a reaction product cake and recovering the magnetic portion thereof. The reaction product cake is comprised of magnetic alloy particles substantially or completely surrounded by calcium and/or a calcium compound selected from the group consisting of calcium oxide, calcium hydride and calcium nitride. The magnetic alloy particles consist essentially of rare earth metal and a metal selected from the group consisting of cobalt, iron, manganese and alloys thereof. The process comprises providing a substantially vertical reactor having a gas inlet at its lower end portion and an outlet at its upper end portion, placing the reaction product cake or lumps thereof in said reactor between said gas inlet and said outlet, passing a water vapor-carrying gas through said gas inlet to react with said calcium and or said calcium compound causing a significant volume increase which disintegrates said reaction product cake, said water vapor-carrying gas initially having a temperature ranging from about 0°C to about 70°C and a relative humidity ranging from about 5% to 100%. The reaction product cake is substantially inert to the gas component of the water vapor-carrying gas. The water vapor-carrying gas is passed through the reactor at a rate which fluidizes the disintegrated cake within the reactor and until substantial conversion to calcium hydroxide is completed producing a substantially hydrated powder. Means are provided for generating a magnetic zone a significant distance into a cross-section of the reactor and to encircle the inside wall thereof to at least a significant extent. The magnetic zone is comprised of at least two magnetic poles of opposite polarity, each magnetic pole running the full length of said zone, substantially parallel to the associated inside wall of the reactor, said magnetic poles being rotatable or reversible. A substantially inert fluidizing gas is passed through the inlet upwardly to fluidize the hydrated powder disassociating and passing the calcium hydroxide through the outlet. Finer-sized alloy particles carried by the fluidizing gas into the magnetic zone are subjected to the magnetic poles which are rotated or reversed at a rate which reverses the positions of the alloy particles sufficiently to release adherent calcium hydroxide leaving the finer-sized alloy particles substantially within the magnetic zone.

The water vapor-carrying gas consists essentially of water vapor and a gas to which the alloy particles are substantially inert such as nitrogen or argon. Before it is introduced into the reactor, the water vapor-carrying gas has a relative humidity ranging from about 5% to 100% and a temperature ranging from about 0°C to 70°C, and preferably, it is close to room temperature, i.e., 20°C to 30°C. At a relative humidity below 5% the water vapor-carrying gas produces a hydration reaction too slow to be commercially useful. With increasing relative humidity, the rate of reaction in the reactor increases resulting in a faster disintegration of the cake. At a temperature below 0°C, the water vapor-carrying gas cannot provide the minimum necessary relative humidity, and as a practical matter, temperatures higher than 70°C cannot be used since the hydration reaction to form calcium hydroxide is exothermic, and the product may overheat and begin to oxidize. The water vapor-carrying gas can be provided by conventional equipment, such as, for example, a home humidifier.

The water vapor-carrying gas is passed through the reactor upwardly to envelop the reaction product cake material therein. The particular rate at which the water vapor-carrying gas passes through the reactor depends largely on its initial relative humidity and temperature and the rate at which the reaction product cake or lumps thereof disintegrate. It should be sufficient to fluidize the disintegrating material within the reactor to provide good contact with the calcium and calcium compounds and thereby significantly accelerate their hydration and accompanying disintegration of the mass. Frequently, after reaction of the water vapor with the calcium or calcium compounds, no significant amount of water vapor is left in the resulting reacted gas passing through the outlet. In the present process, water does not condense on the reaction product cake during disintegration since its hydration is exothermic keeping its temperature higher than that of the water vapor with which it is contacted. However, once the reaction product cake is completely disintegrated, i.e., there is no more calcium or calcium compound available for hydration, the temperature of the disintegrated mass cools and such final product should be kept from contact with water vapor to prevent condensation of water thereon and its accompanying deterioration of magnetic properties.

The reaction of calcium or its compounds in the present process is exothermic, and if desired, a cooling jacket may be used to prevent the reactor from overheating. The reactor can be equipped with conventional equipment such as a humidity sensor, preferably at its upper end portion, to determine the amount of water vapor left in the reacted gas. Preferably, it is provided with thermocouples which are equipped to maintain the disintegrating mass below a certain desirable maximum temperature, for example 50°C, by stopping the introduction of the water vapor-carrying gas into the reactor, and once the disintegrating mass cools below the set desired maximum temperature, starting up the reaction again by allowing the water vapor-carrying gas to be passed into the reactor.

In the present invention the hydration and disintegration of the reaction product cake proceeds between and along the boundaries of the magnetic alloy particles and the final disintegrated product, i.e., the resulting hydrated powder, is usually free-flowing and comprised substantially of calcium hydroxide and the magnetic alloy particles and frequently contains a minor amount calcium oxide. The magnetic alloy particles generally have an average particle size of less than 40 microns. It is believed that during the accompanying increase in volume, much of the calcium hydroxide formed by the hydration actually shears away from the magnetic alloy particles thus yielding discrete particles of calcium hydroxide and magnetic alloy.

In the present process the magnetic alloy particles are recovered from the hydrated powder by a fluidizing gas and a radially magnetized multi-pole magnet thereby preserving their magnetic properties. This dry separation is made possible because the rare earth alloy particles are magnetic and the remainder of the hydrated powder is nonmagnetic. Also, the density of the present magnetic rare earth alloy particles is substantially higher than that of the calcium hydroxide, i.e., it is at least twice that of calcium hydroxide. For example, $Co_5Sm$ has a density of 8.6 grams/cc, whereas calcium hydroxide has a density of 2.3 grams/cc. The difference in densities promotes the retention of the alloy particles in the reactor and the elimination of the calcium hydroxide out of the reactor.

In the present process once the hydrated powder is formed, the flow of water vapor-carrying gas through the reactor is stopped and a dry substantially inert fluidizing gas such as argon or nitrogen, preferably at room temperature, is passed through the inlet to fluidize the hydrated powder to dissociate the calcium hydroxide and carry it through the reactor outlet. The finer-sized alloy particles carried up with the calcium hydroxide are subjected to a rotating or reversing multi-alternating-pole radially magnetized magnet. Specifically, a multi-pole radially magnetized magnet is used to generate a magnetic zone a significant distance into a cross-section of the reactor and to encircle the inside wall thereof completely or to a significant extent. The magnetic zone preferably is located at the upper portion of the reactor and between the gas inlet and the reactor outlet. The zone is comprised of at least a pair, and preferably several pairs of magnetic poles of opposite polarity, which run the full length of the zone and which are substantially parallel to the associated inside wall of the reactor. The magnetic poles are rotatable or electrically reversible.

Those skilled in the art will gain a further and better understanding of the present invention from the detailed description set forth below, considered in conjunction with the sole FIGURE accompanying and forming a part of the specification which illustrates the present process and shows a vertical cross-section taken through a typical apparatus constructed in accordance with the invention.

The accompanying FIGURE shows a vertical cylindrical reactor 1 having a gas inlet 2 and an outlet 3 and containing hydrated powder 5 which, for example, consists essentially of magnetic cobalt-samarium alloy particles and calcium hydroxide and a minor amount of calcium oxide. The reactor is provided with a rotatable multi-pole cylindrical radially magnetized ferrite magnet 4 which is radially magnetized in eight strips of alternating polarity and which can be rotated by conventional means such as induction motor not shown. Magnet 4 provides reactor 1 with a magnetic zone 6 which penetrates into the cross-section of the reactor and encircles the associated inner non-magnetic reactor wall. A substantially inert gas such as argon or nitrogen, preferably at room temperature, is passed through inlet 2 to fluidize hydrated powder 5 to dissociate the calcium hydroxide from the much denser alloy particles and carry the non-magnetic portion of the hydrated powder out of reactor 1 through outlet 3. The finer-sized alloy particles are carried up to the magnetic zone where the magnet is rotated sufficiently in the direction shown by arrow 7 to cause the resulting rotating magnetic poles to reverse the positions of the magnetic alloy particles causing them to shake off adherent calcium hydroxide which then passes through outlet 3 leaving the finer-sized alloy particles 8 in magnetic zone 6.

Additional representative means for providing the magnetic zone in the present invention are rotatable cobalt-samarium alloy permanent magnets for providing a rotating magnetic field or electrically commutated electromagnets for providing a reversible field. Whether the magnetic field is rotated or reversed, the result is the same, i.e., such rotation or reversibility should reverse the positions of the magnetic alloy particles sufficiently to shake off the calcium hydroxide which is then passed out of the reactor outlet. The final separated magnetic portion left in the reactor preferably never contains more than 1% by weight of calcium in any form.

The number of alternating magnetic poles employed, the optimum rate of rotation or reversal of these poles as well as optimum magnetic flux is determinable empirically depending largely on their effectiveness in recovering the magnetic alloy particles.

If desired, the present hydrated powder can be produced as disclosed in copending application Ser. No. 475,900 filed of even date herewith and assigned to the assignee hereof and which, by reference, is made part of the disclosure of the present application. Specifically, the referred to copending application disclose the selection of a support screen having holes through which material of a desired size will pass and which is placed within a hydration zone. The reaction product cake is placed on the screen and a water vapor-carrying gas is passed through the zone to react with calcium and/or calcium compounds in the cake to produce calcium hydroxide. The resulting volume expansion disintegrates the cake which, upon disintegrating to the desired size, falls through the holes in the screen away from substantial contact with the incoming water vapor-carrying gas.

What is claimed is:

1. A process for hydrating and disintegrating a reaction product cake and recovering the magnetic portion thereof, said reaction product cake being comprised of magnetic alloy particles substantially or completely surrounded by calcium and/or a calcium compound selected from the group consisting of calcium oxide, calcium hydride and calcium nitride, said magnetic alloy particles consisting essentially of rare earth metal and a metal selected from the group consisting of cobalt, iron, manganese and alloys thereof, which comprises providing a substantially vertical reactor having a gas inlet at its lower end portion and an outlet at its upper end portion, placing said reaction product cake in said reactor substantially between said gas inlet and said outlet, passing a water vapor-carrying gas through said gas inlet to react with said calcium and/or said calcium compound causing a significant volume increase which disintegrates said reaction product cake, said water vapor-carrying gas initially having a temperature ranging from about 0°C to about 70°C and a relative humidity ranging from about 5% to 100%, said reaction product cake being substantially inert to the gas component of said water vapor-carrying gas, said water vapor-carrying gas being passed through said reactor at a rate which fluidizes said disintegrated cake within said reactor and until substantial conversion to calcium hydroxide is completed producing a substantially hydrated powder, providing means for generating a magnetic zone between said gas inlet and outlet a significant distance into a cross-section of the reactor encircling the inside wall thereof to a significant extent and being comprised of at least two magnetic poles of opposite polarity running the full length of said zone and substantially parallel to the associated inside wall of the reactor, said magnetic poles being rotatable or reversible, passing an inert gas through said inlet upwardly to fluidize said hydrated powder disassociating and carrying the calcium hydroxide through said outlet, said magnetic alloy particles of finer size carried by said fluidizing gas into said magnetic zone being caught by the poles which are rotated or reversed at a rate sufficient to significantly reverse the positions of the particles resulting in release of adherent calcium hydroxide leaving the finer-sized particles within said magnetic zone.

2. A process according to claim 1 wherein the magnetic alloy particles consist essentially of Co and Sm.

3. A process according to claim 1 wherein said means is a multi-pole rotatable radially magnetized substantially cylindrical magnet.

4. A process according to claim 1 wherein said means is an electrically commutated electromagnet.

5. A process for recovering the magnetic portion of a powdery material comprised substantially of calcium hydroxide and magnetic alloy particles, said alloy particles having an average size less than 40 microns and consisting essentially of rare earth metal and a metal selected from the group consisting of cobalt, iron, manganese and alloys thereof, which comprises providing a substantially vertical reactor having a gas inlet at its lower end portion and an outlet at its upper end portion, placing said powdery material in said reactor between said gas inlet and said outlet, providing means for generating a magnetic zone a significant distance into a cross-section of the reactor significantly encircling the inside wall thereof and being comprised of at least two magnetic poles of opposite polarity running the full length of said zone and substantially parallel to the associated inside wall of the reactor, said magnetic poles being rotatable or reversible, passing an inert gas through said inlet upwardly to fluidize said hydrated powder disassociating and carrying the calcium hydroxide through said outlet, said magnetic alloy particles of finer size carried by said fluidizing gas into said magnetic zone being caught by the poles which are rotated or reversed at a rate sufficient to significantly reverse the positions of the particles resulting in release of adherent calcium hydroxide leaving the finer-sized particles within said magnetic zone.

6. A process according to claim 5 wherein said magnetic alloy particles consist essentially of Co and Sm.

* * * * *